Figure 1:
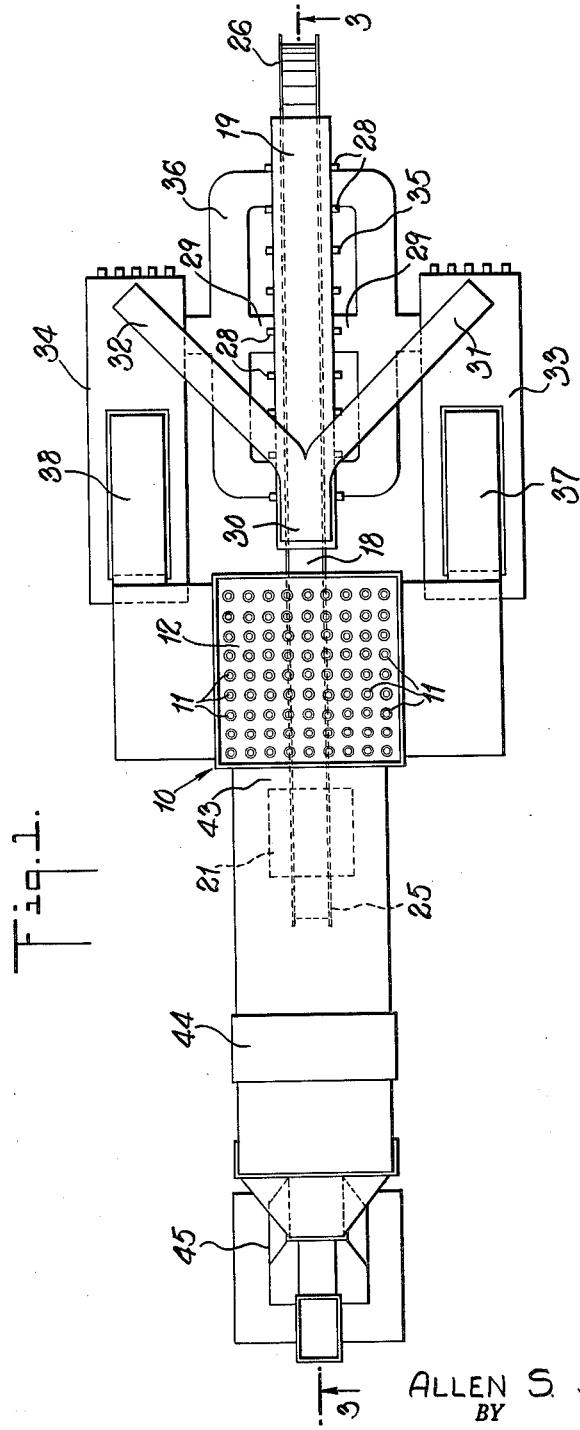

April 17, 1962  A. S. JOHNSON, JR  3,030,090
HEAT TREATMENT OF MINERALS

Filed Feb. 26, 1959  7 Sheets-Sheet 1

INVENTOR.
ALLEN S. JOHNSON, JR.
BY
Benj. T. Rauber
ATTORNEY

April 17, 1962

A. S. JOHNSON, JR 3,030,090

HEAT TREATMENT OF MINERALS

Filed Feb. 26, 1959

7 Sheets-Sheet 2

INVENTOR.
ALLEN S. JOHNSON, JR.
BY
*Benj. T. Rauber*
ATTORNEY

April 17, 1962 A. S. JOHNSON, JR 3,030,090
HEAT TREATMENT OF MINERALS

Filed Feb. 26, 1959 7 Sheets-Sheet 3

INVENTOR.
ALLEN S. JOHNSON, JR.
BY
Benj. T. Rauber
ATTORNEY

April 17, 1962    A. S. JOHNSON, JR    3,030,090
HEAT TREATMENT OF MINERALS

Filed Feb. 26, 1959    7 Sheets-Sheet 6

INVENTOR.
ALLEN S. JOHNSON, JR
BY
Benj. T. Rauber
ATTORNEY

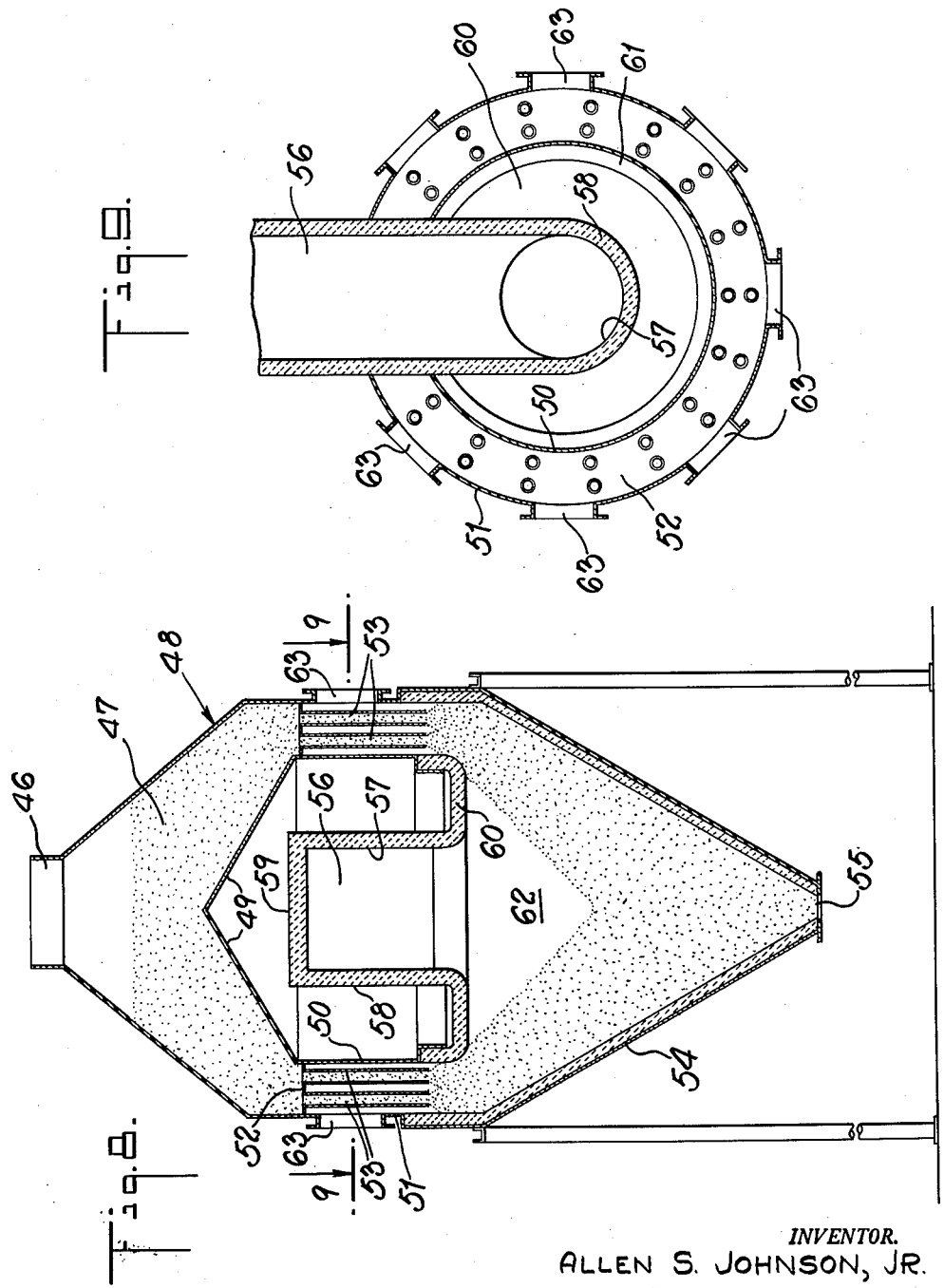

United States Patent Office 3,030,090
Patented Apr. 17, 1962

3,030,090
HEAT TREATMENT OF MINERALS
Allen S. Johnson, Jr., Salisbury, N.C., assignor to Carolina Tuff-Lite Corporation, Salisbury, N.C., a corporation of North Carolina
Filed Feb. 26, 1959, Ser. No. 795,684
16 Claims. (Cl. 263—28)

My invention relates to a method and apparatus for heat treating minerals and other materials at temperatures at which they become sticky or viscous. More particularly the invention relates to a method and apparatus for expanding rock aggregates by heat to form aggregates of porous, cellular or foam structure and of a hardness suitable for use in concrete. It is frequently necessary to bring certain rocks to a temperature at which they soften and become sticky or viscous or semi-fluid in order to obtain a required chemical reaction or chemical treatment.

Heretofore this has been accomplished by heating the materials in a rotary kiln. However, as these rocks approach the point at which they became somewhat tacky or adhesive they had a tendency to build up on the wall of the kiln and adhere thereto thus building up an adhesive mass which would not detach itself from the kiln wall and which could not be detached by tools until it had become cold and solidified and had to be chipped or chiselled out. This required shut downs and the use of additional labor, and might also be deleterious to the kiln structure. Similar conditions might be encountered in the treatment of non-mineral materials, or organic materials, which may act in the same manner under heat.

The invention is applicable particularly to the transformation by heating at high temperatures of rock materials to cellular somewhat vitrified aggregates having great strength and lightness and being, therefore, desirable for concrete.

Certain rocks generally slates or shales, have the property of softening at elevated temperatures, for example, at about 2100° F. to 2300° F., to a viscous, doughy, consistency and also of evolving gases at this temperature in the form of minute bubbles to form a foam. When cooled, these rocks solidify while retaining their foam structure to form light weight aggregates of a hard, glassy, form. They are very desirable because of their lightness and strength and water resistance, the pores being substantially closed and the cells watertight.

Because of the viscous, sticky, nature of the rock at the temperature of softening and gas evolution, the heating of the rock aggregates presents many problems.

My invention provides a method and apparatus for heating and handling the rock which avoids these problems and difficulties and forms light weight aggregates of great strength and uniformity.

In my invention, rock aggregates of suitable dimensions, from ½ inch to 1¼ inches, for example, are preheated to a temperature somewhat below that at which they soften, for example, to about 1900° F. to 2050° F., and are then laid on a bed of expanded aggregates on a travelling grate and passed through a tunnel type of furnace in which they are heated to the temperature at which they soften and evolve gases, for example, to 2100° F. to 2200° F. After passing through the furnace they are cooled and may, if necessary be broken to any desired size. In passing through the furnace, they are insulated from the grates by the bed of expanded aggregates. During the heating in the tunnel furnace they retain their particle identity, permitting furnace gases to pass downwardly through the layer to provide uniform heating.

The preheating of the aggregates is accomplished preferably by passing through the aggregates the exhaust products of combustion from the tunnel furnace, reheated by admixing with fresh combustion gases to a temperature to which the aggregates are to be preheated or slightly above but not sufficiently high to cause softening. This is done by passing the aggregates downwardly through a current of the reheated products of combustion and thence onto the travelling grate at its entrance into the tunnel furnace. Immediately in advance of the delivery of the preheated aggregates to the grate, a layer of expanded aggregates is laid on the grate onto which the preheated aggregates are delivered.

In the tunnel furnace the preheated aggregates are heated by means of fuel burners above the moving layer of the aggregates and some of the products of combustion are drawn downwardly through the layer to insure uniform heating to the softening and gas evolving temperature. The underlying layer of expanded aggregates insulates the preheated aggregates from the grates thus avoiding chilling and insuring uniformity of the product. After leaving the furnace both layers are cooled and separated from the grate.

In the accompanying drawings is shown, by way of example, apparatus embodying my invention and in which the method of my invention may be carried on. In the drawings—

Figure 2:
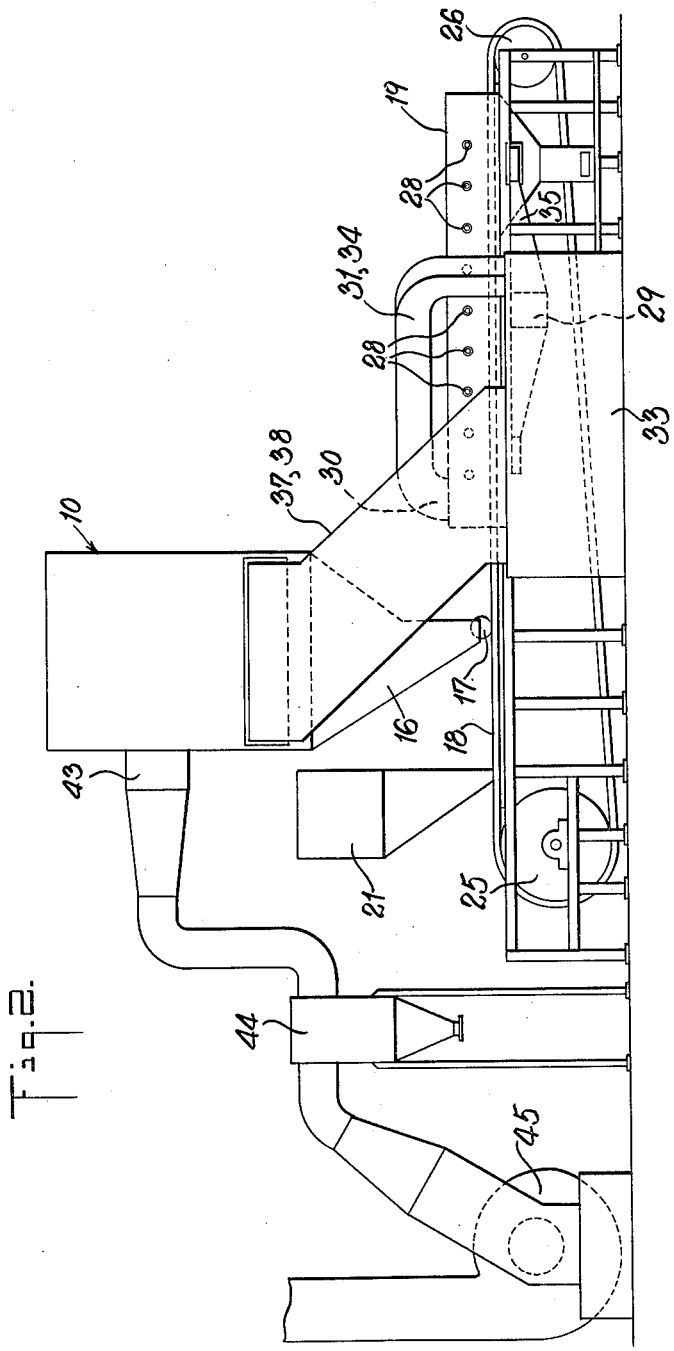
Figure 3:
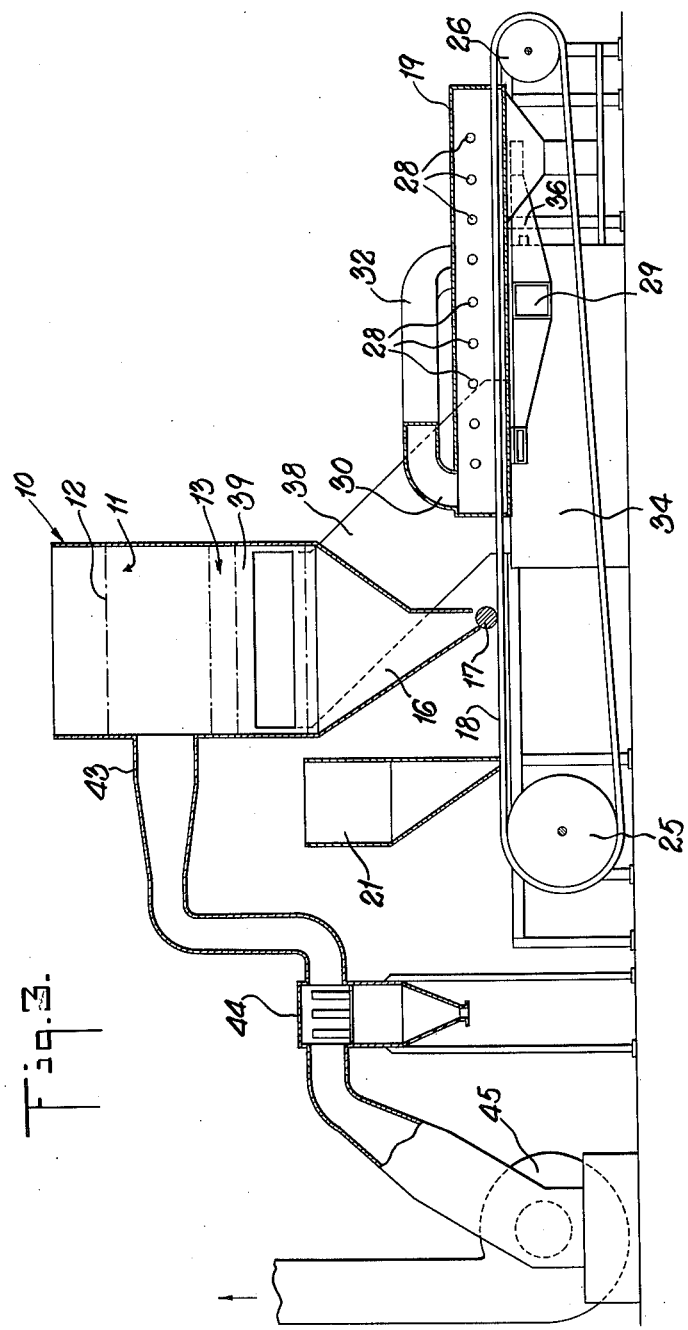
Figure 4:
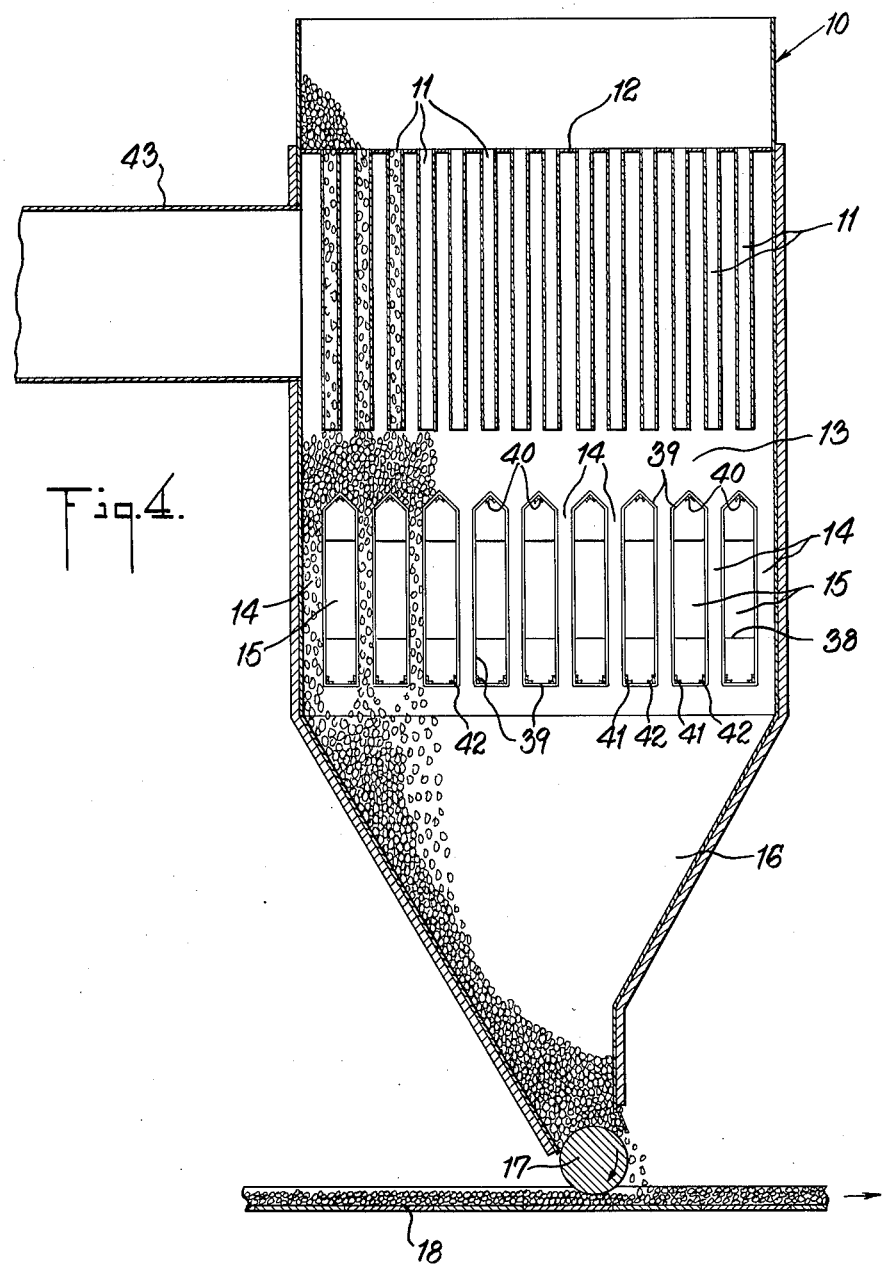
Figure 5:
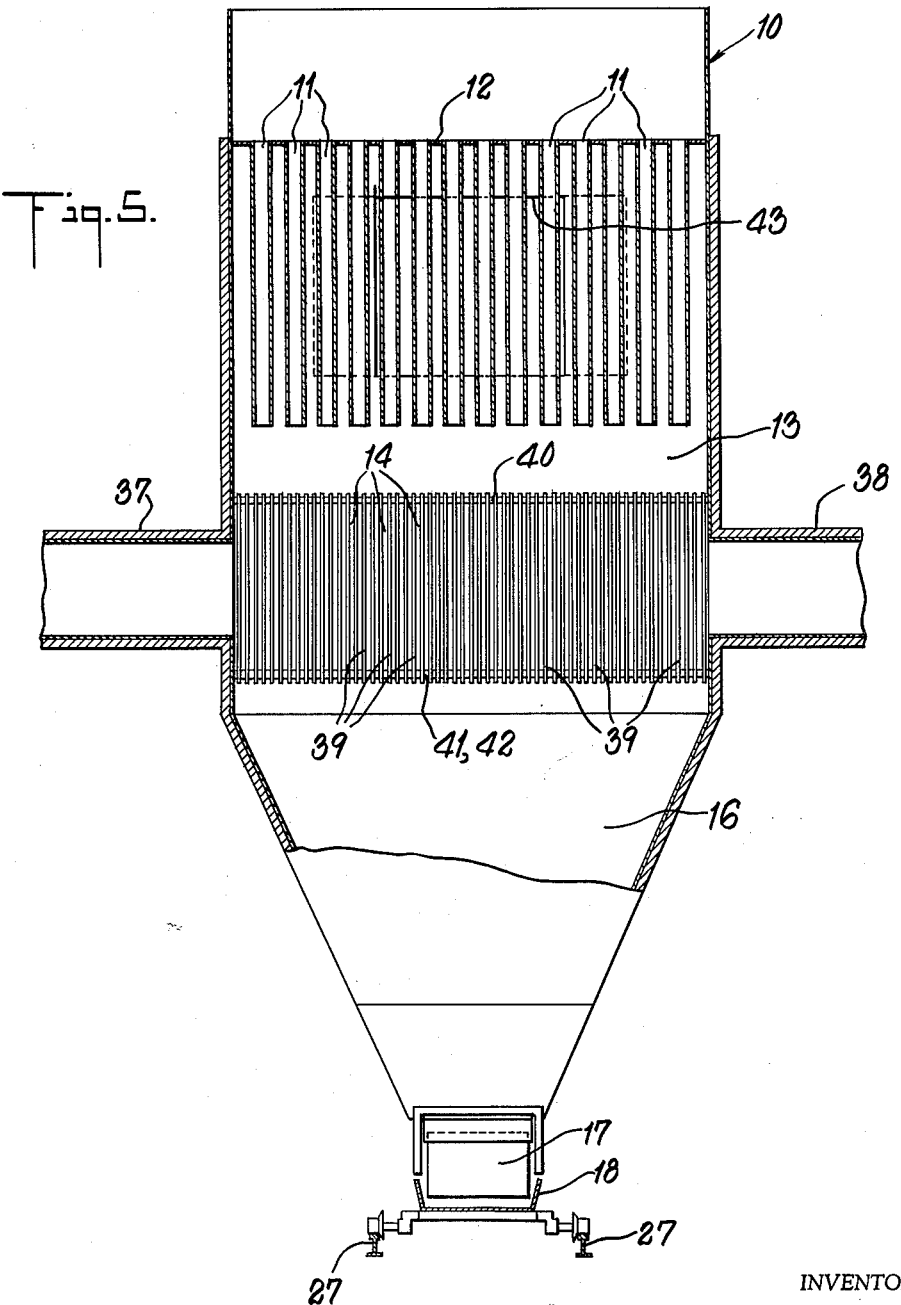
Figure 6:
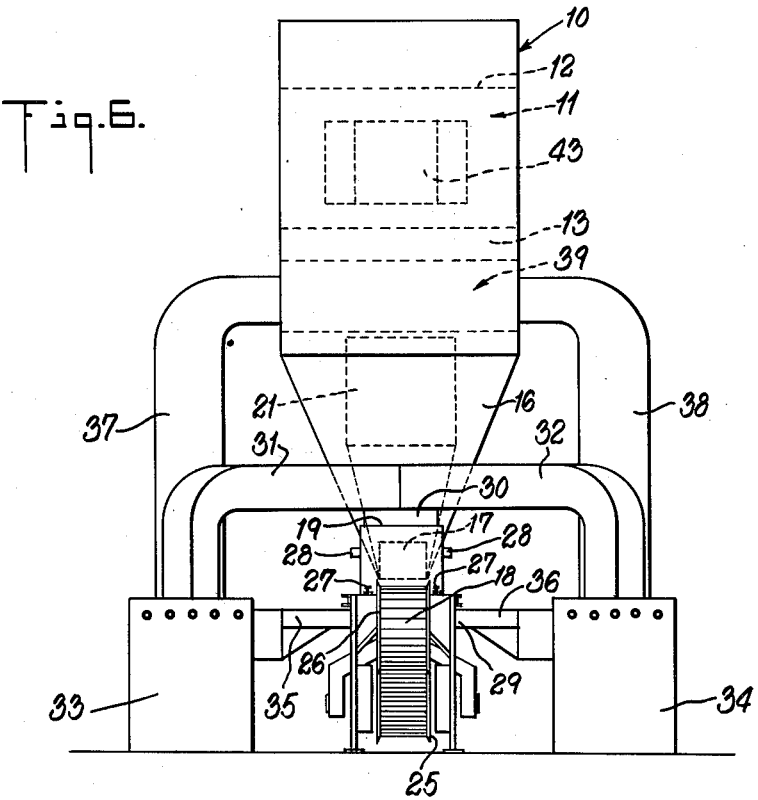
Figure 7:
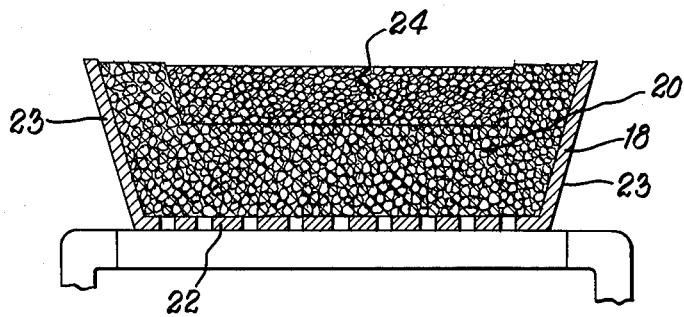

FIG. 1 is a plan of the apparatus;
FIG. 2 is a side elevation of the apparatus;
FIG. 3 is a vertical section on line 3—3 of FIG. 1;
FIG. 4 is a vertical section on line 3—3 on a larger scale of the preheating furnace;
FIG. 5 is a vertical section on the same scale as in FIG. 4 taken at a right angle to the plane of FIG. 4;
FIG. 6 is a front elevation of the apparatus;
FIG. 7 is a section of the grate transverse to its direction of travel;
FIG. 8 is a vertical section, and
FIG. 9 is a section on line 9—9 of FIG. 8, which may be substituted for the shaft shown in FIGS. 4 and 5.

Referring to the drawings, untreated aggregates are fed into a vertical shaft 10 and pass downwardly to and through a preheating zone. Upon entering the preheating zone the aggregates pass downwardly through open ended vertical pipes 11 suspended from a horizontal tube sheet 12 and heated by preheating gases. Upon leaving the lower ends of the pipes or tubes 11, the aggregates enter and pass downwardly through a zone 13 in direct contact with preheating gases passing upwardly to the space about the tubes 11. In the lower part of the zone the aggregates pass downwardly through spaces 14 between horizontally spaced, horizontal, inlet chambers 15 having slits or openings through which the hot products of combustion enter the spaces 14 and pass upwardly through zone 13. Upon leaving the spaces 14 the aggregates are received in a hopper 16.

From the narrow, lower, end of the hopper 16 the preheated aggregates are fed by a roller feeder 17 to a travelling grate 18 in advance of the entrance to a tunnel furnace 19. Immediately in advance of the feeding of the preheated aggregates by the feeder 17 a layer or bed 20 of aggregates is fed into the grate from a hopper 21 placed in advance of the shaft 10 and hopper 16. The travelling grate 18 is of the form in transverse section shown in FIG. 7 with a perforated or foraminous bottom 22 and sloping sides 23 and the bed of expanded aggregates 20 covering the bottom and sides to form a shallow trough in which the preheated layer 24 of aggregates is laid. The travelling grate may be of the type used in sintering machines, that is, of a succession of pallets passing on a suitable guiding and supporting structure from a guide 25 in advance of the hopper 21 to and through the furnace 19 and from the exit end of the furnace to a return guide 26. From the return guide 26 the pallets pass on supporting rails 27 to the guide 25.

The grate may be driven by any suitable means known in the art.

As the bed of preheated aggregates passes through the furnace 19 it is heated by burners 28 above the grate at intervals lengthwise of the furnace. The aggregates are heated by radiant heat from the burning gases and also by products of combustion drawn downwardly through the bed and grate into an exhaust chamber 29 between the upper and return reaches of the grate. The combustion gases passing downwardly through the grate serve to carry the heat uniformly through the bed of aggregates 24. The underlying bed 20 of expanded aggregates insulates the bed of aggregates 24 from the grate and thus prevents chilling the bottom of the bed 24 and insures uniform heating and uniformity of product.

After passing through the furnace the pallets of the grate pass about the guide 26 and the treated aggregates 24 and the already expanded aggregates of the underlying bed 20 are discharged. The aggregates 24 are now expanded and the same as those of the bed 20 and they may, therefore, be intermingled. A part of the finished aggregates may be returned to the hopper 21.

The exhaust products of combustion from the furnace 10 are used to preheat the raw aggregates in the preheating zone 13. For this purpose combustion gases are drawn in part from above the grate and part from the exhaust chamber 29 below the grate and after reheating are passed to the preheating zone. To maintain uniform heating transversely of the furnace and to distribute the combustion gases uniformly through the preheating zone the combustion gases are withdrawn from each side of the furnace to reheating furnaces on opposite sides of the furnace and then supplied to opposite sides of the preheating zone.

The combustion gases from above the grate are withdrawn from the entrance end of the furnace through an off-take duct 30 from the top of the furnace which divides into two branches 31 and 32 leading respectively to reheating furnaces 33 and 34 and entering these furnaces at their rear ends. Combustion gases are exhausted from opposite sides of the exhaust chamber 29 through manifolds 35 and 36 having connections at intervals lengthwise of the exhaust chamber and deliver to the rear ends of the furnaces 33 and 34, respectively. Each of the reheating furnaces is provided with a fuel burner and intake for air and fuel to supply additional heat to reheat the exhaust gases to a suitable temperature to be supplied to the preheating zone 13.

From the reheating furnaces 33 and 34, the hot gases are conveyed through ducts 37 and 38, respectively, to opposite sides of the shaft 10 and enter the spaced transverse inlet chambers. The outlet ends of the ducts 37 and 38 extend horizontally the width of the chambers 15 to distribute the gases uniformly among the chambers.

The preheating gases are distributed from the chambers to the aggregates passing downwardly between them through openings in the walls of the chambers. In the embodiment shown in the drawings the chambers are formed of a series of metal loops 39 supported at their upper ends on a transverse beam or rod 40 and held in position at their lower ends by a pair of transverse rods or beams 41 and 42. The loops are spaced apart a distance sufficient to prevent any of the particles of aggregates from entering the chambers. For example the loops may be of ½ inch diameter and be spaced ¾ inch from center to center.

From the chambers 15 the hot gases pass through the spaces between the loops into the passages 14 and thence upwardly through the heating zone to the space about the down-take pipes 12 and then into an outlet or exhaust duct 43. The gases, being in direct contact with the aggregates give up the greater part of their heat to them and also give up additional heat to the aggregates passing downwardly through the tubes 11 while collecting to enter the exhaust duct 43. The exhaust gases are drawn through the duct 43 and through a dust collector 44 by an exhaust fan 45.

In the embodiment shown in FIGS. 8 and 9 the rock aggregates are fed downwardly through an opening 46 into a downwardly expanding upper part 47 of a preheating shaft 48. The material thus supplied to the space 47 comes to rest on a conical partition 49 extending to a cylindrical wall 50 spaced inwardly of an outer cylindrical wall 51 of the shaft 48. An annular space is formed between the cylindrical walls 50, 51 and the upper part of this annular space is closed by means of an annular horizontal tube sheet 52 spanning the space between the walls 50, 51. A number of vertical open ended tubes 53 are mounted at their upper ends in regularly spaced openings in the tube sheet 52 and depend downwardly through the annular passage between the walls 50, 51. The aggregates sliding down the slope of the cone 49 are thus received in the several tubes or pipes 53 in which they are heated by the preheating gases. From the lower open ends of the tubes 53 the preheated aggregate passes downwardly to a hopper-shaped bottom 54 of the preheater shaft and hence through an opening 55 at the bottom of the hopper to the travelling grate.

The gas for preheating the rock aggregates is admitted through an inlet pipe 56 to a distributing dome 57 having cylindrical side walls 58 and a top wall or cover 59. Whereas the outer walls of the shaft may be made of steel or other suitable metal, the walls of the inlets 56 under the dome are made of heat-resistant material, such as fire brick. The distributing dome 57 is supported at its lower end from the cylindrical wall 50 by means of a horizontal extension 60 of the cylindrical wall 58 which is turned upwardly at its outer end as at 61 to unite fluidtightly to the wall 50. The preheating gases admitted to the distributing dome 57 pass downwardly through the lower open end of the dome into a hollow space 62 which forms within the rock or other aggregate material in the hopper 54. The hot gases thus pass into the space 62 and then uniformly outwardly to the annular space between the walls 50, 51 in which they circulate in contact with the heating pipes 53 and pass from this annular space through a gas outlet 63.

A still further method and apparatus for preheating the material is described and illustrated in my co-pending application Ser. No. 787,298, filed January 16, 1959. In the method and apparatus of this co-pending application the rock aggregates are fluidized, that is, they are maintained in suspension in the heating gases so that they may flow as a liquid. In this apparatus they are thus treated in successive heat treatments or zones flowing downwardly from one to the other countercurrent to upward passages of heating gases. Fluidized rock or other material overflowing from the lower stage or fluidizing heating, then flow to the inlet or supply end of the travelling grate for further increase in temperature and in heat treatment.

In the method and apparatus of my invention shales capable of expanding when heated to a temperature at which they soften may be brought by preheating them with hot gases or hot products of combustion at regulated temperatures to a temperature just below that of their softening without danger of softening. Then they may be brought to the temperature of softening and gas evolution quickly and uniformly and without fusing them to an impenetrable mass and without contact with any part of the heating equipment to which they might adhere. Suitable control dampers, fuel control and other equipment known in the art may be used to control the temperatures and are not shown in the drawings and described in the specification as they are well known in the art.

Having described my invention, I claim:

1. A method of heat treating rock aggregates which comprises passing hot combustion gases upwardly through a heating zone of a downwardly moving column of expansible rock aggregates to heat said aggregates to a temperature short of their fusing temperature, spreading said heated aggregates to a layer on a bed of expanded aggregates and heating said preheated aggregates to a temperature at which they soften to a pasty consistency and expand to a cellular structure.

2. The method of claim 1 in which said preheated aggregates are heated by a flame of fluid fuel and the products of combustion from said flame are passed downwardly through said layers of aggregates.

3. The method of claim 1 in which said preheated aggregates are heated by the combustion of fluid fuel and the products of combustion are passed to said heating zone to preheat aggregates.

4. The method of claim 1 in which said aggregates are withdrawn continuously from the bottom of said column and spread on a moving bed of said expanded aggregates.

5. Apparatus for treating rock aggregates by heat which comprises a preheating element through which said aggregates may descend, a furnace having a travelling grate, means for feeding a bed of pre-treated aggregates onto said grate in advance of said furnace, means for feeding aggregates from said preheating element to said bed of pre-treated aggregates, and means for burning fluid fuel and passing the hot products of combustion through said preheated aggregates in said furnace and then to and through a heating zone in said preheating element in heat exchange relation to said aggregates.

6. Apparatus for treating rock aggregates by heat which comprises a shaft through which said aggregates may descend, a furnace having a travelling grate, means for feeding a bed of expanded aggregates onto said grate in advance of said furnace, means for feeding aggregates from said shaft to said bed of expanded aggregates, and means for burning fluid fuel in said furnace and passing the hot products of combustion through the preheated aggregates and then from said furnace to and through a heating zone in said shaft.

7. Apparatus for treating rock aggregates by heat which comprises a shaft through which said rock aggregates may descend, a series of inlet chambers for heating gases extending transversely in said shaft and an outlet means for said gases above said inlet chambers, a furnace having a travelling grate and means for burning fuel above said grate, means for feeding a bed of expanded aggregates to said grate in advance of said furnace, means for feeding rock aggregates from said shaft to said bed of expanded aggregates in advance of said furnace, and means comprising ducts for drawing products of combustion through said preheated aggregates and thence conducting said combustion gases from said furnace to the inlet chambers in said shaft.

8. Apparatus of claim 7 comprising ducts for the passage of combustion gases from said furnace beneath said grate to said inlet chambers.

9. Apparatus of claim 7 comprising ducts from said furnace above and beneath said grate for the passage of combustion gases to said inlet chambers in said shaft.

10. Apparatus of claim 7 having means between said furnace and said inlet chambers to said shaft to heat said hot combustion gases, supplied to said inlet chambers in said shaft.

11. Apparatus of claim 10 in which said means for heating said hot combustion gases comprises a furnace between said first mentioned furnace and said inlet chambers in said shaft.

12. Apparatus of claim 10 having ducts from opposite sides of said furnace and means to heat said combustion gases from said furnace for each of said ducts.

13. The apparatus of claim 7 comprising a plate spanning said shaft above said outlet means and open ended pipes mounted in said plate and extending downwardly to lower ends below said outlet means.

14. The apparatus of claim 13 in which said lower ends of said pipes are above said inlet chambers.

15. The apparatus of claim 7 in which said inlet chambers are spaced transversely of said shaft and extend from one wall of said shaft and have openings to passages between said chambers.

16. The apparatus of claim 15 in which said inlet chambers comprise a series of closely spaced vertical loops extending from one end of the chambers to the other to form said openings.

References Cited in the file of this patent

UNITED STATES PATENTS

| | | |
|---|---|---|
| 1,763,538 | Randolph | June 10, 1930 |
| 1,906,766 | Karrick | May 2, 1933 |
| 2,052,324 | Thomson | Aug. 26, 1936 |
| 2,174,066 | Ahlmann | Sept. 26, 1939 |
| 2,451,024 | Ellerbeck | Oct. 12, 1948 |
| 2,807,453 | Pierce | Sept. 24, 1957 |